May 13, 1947. M. C. K. JONES 2,420,544
PROCESS FOR THE REMOVAL OF MERCAPTANS FROM PETROLEUM NAPHTHA
Filed May 15, 1943
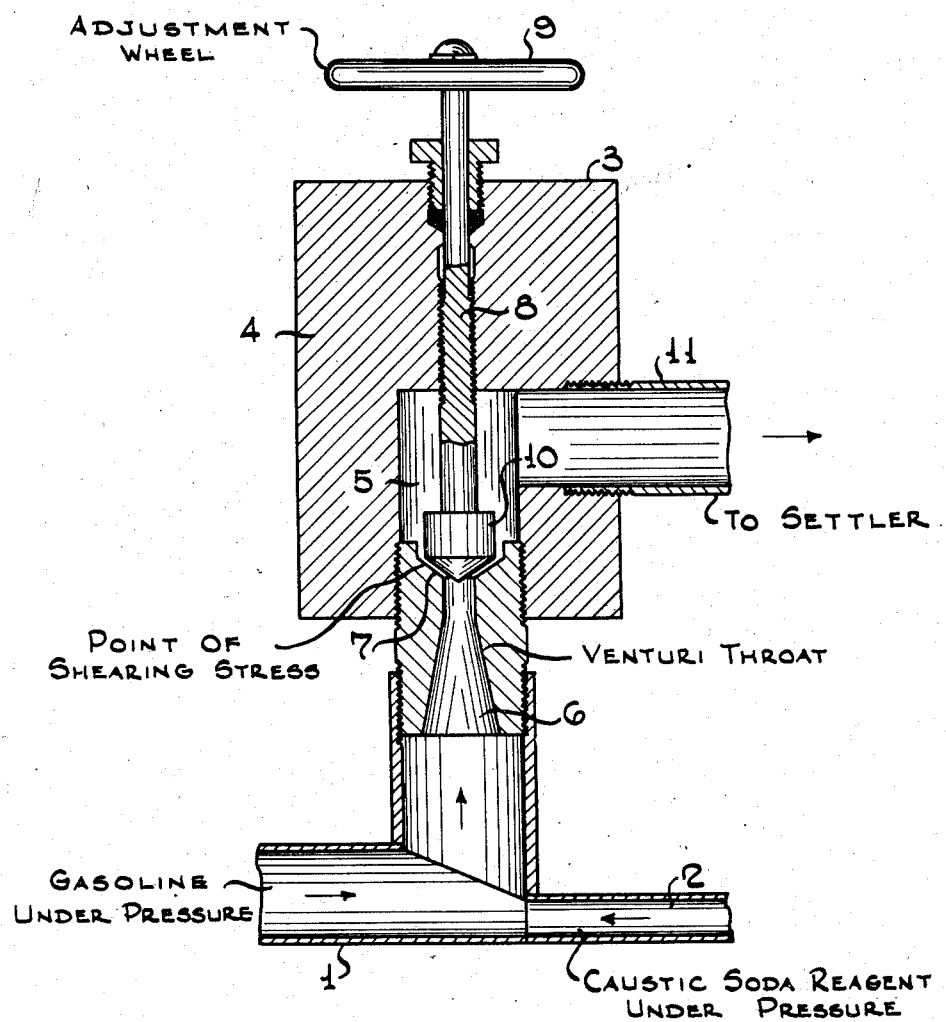
Minor C. K. Jones  Inventor
By J. M. Amall  Attorney Patented May 13, 1947

2,420,544

UNITED STATES PATENT OFFICE 2,420,544

PROCESS FOR THE REMOVAL OF MERCAPTANS FROM PETROLEUM NAPHTHA

Minor C. K. Jones, Mountainside, N. J., assignor to Standard Oil Development Company, a corporation of Delaware Application May 15, 1943, Serial No. 487,139

2 Claims. (Cl. 196—32)

This invention relates to the treatment of liquids with liquid treating agents especially those immiscible or only slightly miscible with the liquid to be treated, and relates, more particularly, to an improved method for treating light mineral oils with a liquid treating agent.

In the treatment of heavy oils with immiscible treating agents, there have been many attempts to obtain thorough agitation. This is particularly advantageous when the agent has a deleterious local effect unless carefully dispersed through the material being treated as, for example, in the treatment of oils with sulfuric acid.

However, in the treatment of light oils with liquid reagents, it has never been considered necessary to agitate the oil thoroughly with the reagent. In fact contact by blowing with air, stirring, shaking, or passing the reagent countercurrent to the oil has usually been considered sufficient. This is particularly true in the solvent extraction or caustic treatment of these light oils where one or two stages is conventional. Thorough agitation or mixing, such as is sometimes found necessary in acid-treating heavy oils, has not been considered desirable in the prior art.

It has now been found that the efficiency of light oil treating methods can be materially increased by effecting the intimate dispersion of one phase in the other by mechanical action wherein an unstable emulsion is formed which quickly breaks to insure adequate separation of the phases.

This method is not to be confused with the well known methods of adding the reagent to oils by drops or small streams, or forcing streams of the reagent beneath the surface of the oil. It should also be distinguished from methods by which the acid is sprayed by air or steam or other gases. By the term "mechanical action" is meant the mechanical dispersion of the oil with the treating agent under such conditions that the oil and the treating agent are subjected to a shearing action as a result of which the two phases break down into microscopically fine particles which are thoroughly mixed one with the other so that there more readily results the equivalent of a theoretical stage than in conventional contacting methods. Physical or chemical action is accomplished more effectively than in conventional countercurrent packed towers so that such tall towers are not needed and much less space is required for equipment.

This degree of subdivision may be produced by one of several different devices now available; for instance, it may be produced by means of a colloid mill, a homogenizing valve such as used in the food industry, or any other device such as those in which a rotating disc operates against a stator with a very small clearance between the disc and the stator or in which two stators operate in conjunction with an adjustable orifice. In any of these devices, the feeding pressure must necessarily be very high, probably of the order of 2000 to 5000 lbs. per square inch. The shearing stress of these devices greatly reduces the size of the globules leaving the device and enormously increases their number. It is of course understood that any other device which would give an equal intimate dispersion of the two phases is contemplated by this invention.

The homogenization or dispersion obtained by the present invention, in many cases, differs from that obtained in the food and other industries using such a high degree of mechanical dispersion, particularly by providing for the preparation of a very unstable emulsion which promptly separates into the original phases, thus furnishing a very short time of contact between the treating agent and the oil. Two mutually insoluble liquids may be emulsified by mechanical agitation but will be unstable and will readily separate into the original phases when (1) the emulsion contains more than 1% of the dispersed phase and/or (2) the two liquids are free from emulsifying agents. It is therefore eminently desirable that prior to mechanical agitation the liquids be freed of emulsifying agents and other impurities by careful distillation or filtration in the conventional manner.

Examples of other applications of homogenization in chemical engineering where subsequent immediate separation into the original phases is not involved would be in the incorporation of addition agents such as anti-oxidants or inhibitors (some of which are difficultly soluble), and in the production of emulsions in synthetic rubber manufacture as in the contact of isoprene, methyl chloride and isobutylene.

Liquid-liquid chemical and physical action by homogenization provides a method for controlling the time and temperature of reactions in a manner which is not possible in conventional procedures. There are numerous examples of liquid-liquid reactions utilized in petroleum technology which can be carried out with greater efficiency than usual by the use of dispersion from mechanical action such as homogenization.

For example, in the alkylation process for the production of aviation gasoline, isobutane is combined with butylene to form saturated octanes having high anti-knock qualities. This synthesis is accomplished in the presence of a catalyst such as strong sulfuric acid so that the reaction can be carried out at low temperatures with a minimum of secondary reactions of the hydrocarbons and sulfuric acid. It is customarily held that the alkylation reaction itself takes place either on the surface or within the catalyst phase. Isobutane, although relatively insoluble in sulfuric acid, presumably should be present in the catalyst phase to the maximum extent possible before the olefin comes in contact with the acid. Otherwise the olefins would themselves polymerize or react with the acid. However, when isobutane is present reaction takes place between this isobutane and butylene forming the desired octane. By emulsifying the hydrocarbons and acid by means of a homogenizer, an extremely large active surface is exposed to the hydrocarbons present and any desired contact time is made possible simply by circulating the emulsion. The alkylate produced becomes a part of and is recirculated with the emulsion dissolved in the excess of hydrocarbons present, until removed by continuously withdrawing part of the emulsion, separating the acid by settling, and distilling the hydrocarbons to obtain the various fractions.

As another example of a liquid-liquid reaction which can be achieved more effectively by the present invention may be mentioned the sweetening of petroleum distillates with various reagents.

However, one of the most important applications of the present invention is in the field of solvent extraction. For example the present invention is particularly useful in the following solvent extraction processes:

(a) Hydrocarbon extraction by sulfur dioxide
(b) Hydrocarbon extraction by phenol
(c) Hydrocarbon extraction by furfural
(d) Vapor phase absorption of isobutylene by sulfuric acid
(e) Extraction of butadiene and isoprene by suitable solvents.
(f) Extraction of mercaptans from gasoline with sodium hydroxide solution.

The single figure is a diagrammatic elevational view of the apparatus with parts in section. Referring now to this drawing, material to be treated such as naphtha introduced through line 1 and a treating agent such as caustic soda introduced through line 2 are mixed and pumped into homogenizing valve 3. This valve consists of block 4 having a bore 5 discharging into venturi 6. A conical seat 7 is provided at the lower end of the bore and a valve stem 8 movably arranged in block 4 and is provided with an adjustment wheel 9 and a head 10 adapted to operate in bore 5 and co-act with valve seat 7 to form a point of shearing stress. The mixture of naphtha and caustic soda introduced through venturi 6 passes the point of shearing in the bore 5 and is withdrawn through line 11 and passed to a settler where the caustic is separated from the naphtha.

As an example of the improved results obtained by this invention when applied to the extraction of mercaptans from a petroleum naphtha, a comparison was made between the results obtained in the usual batch agitation method and the process according to this invention. Naphtha and various strengths of sodium hydroxide were pumped simultaneously through a valve-like mechanism set to discharge at 3000 lbs. per square inch. At the same time, portions of the same naphtha were treated in a separatory funnel using three-minute vigorous agitation by hand shaking. The results of these treatments are set forth and compared in Table I.

TABLE I

EXTRACTION OF MERCAPTANS FROM NAPHTHA WITH VARIOUS REAGENTS BY BATCH AGITATION AND BY HOMOGENIZATION

| Column Number | 1 | 2 | 3 | 4 | 5 | 6 | 7 | 8 | 9 |
|---|---|---|---|---|---|---|---|---|---|
| Stock and Procedure | Untreated Original Naphtha | Treated with Sodium Hydroxide 11.2° Bé. | | | | Treated with [2] Potassium Hydroxide 12.9° Bé. | | | |
| | | Batch Treat [1] | Batch Treat [1] | 3000 #/Sq. In. Homogenization | | Batch Treat [1] | Batch Treat [1] | 3000 #/Sq. In. Homogenization | |
| Operating Conditions: | | | | | | | | | |
| Per cent Treat | | 10 | 20 | 9.9 | 18.4 | 10 | 20 | 9.9 | 26.4 |
| Treating Temp., °F | | 80 | 80 | 75 | 75 | 80 | 80 | 75 | 77 |
| Gasoline Inspections: | | | | | | | | | |
| Doctor Test | [3] DNP | DNP | DNP | DNP | DNP | DNP | DNP | DNP | DNP |
| Mercaptan sulfur, mg./100 ml | 20 | 6 | 3.5 | 4.5 | 3 | 6 | 3 | 4 | 2.5 |
| Per cent Mercaptan Removed | | 70.0 | 82.5 | 77.5 | 85.0 | 70.0 | 85.0 | 80.0 | 87.5 |
| Reactive sulfur, mg./100 ml | 1 | | | | | | | | |
| Peroxide Number | 0 | | | | | | | | |
| Gravity, °API | 52.9 | | | | | | | | |
| Dist., Naph.— | | | | | | | | | |
| I. B. P., °F | 130 | | | | | | | | |
| 212 | 21.0 | | | | | | | | |
| 302 | 62.5 | | | | | | | | |
| 392 | 94.5 | | | | | | | | |
| F. B. P., °F | 421 | | | | | | | | |
| Per cent Recovery | 98.5 | | | | | | | | |
| Per cent Loss | 0.4 | | | | | | | | |

TABLE I—Continued

| Column Number | 10 | 11 | 12 | 13 | 14 | 15 | 16 | 17 |
|---|---|---|---|---|---|---|---|---|
| Stock and Procedure | Treated with Potassium Hydroxide, 6N, 29.6° Bé. | | | | Treated with Solutizer Soln. 3N Potassium Isobutyrate, 6N Potassium Hydroxide | | | |
| | Batch Treat [1] | Batch Treat [1] | 3000 #/Sq. In. Homogenization | | Batch Treat [1] | Batch Treat [1] | 3000 #/Sq. In. Homogenization | |
| Operating Conditions: | | | | | | | | |
| Per cent Treat | 10 | 20 | 10.9 | 18.4 | 10 | 20 | 12.9 | 25.0 |
| Treating Temp., °F | 80 | 80 | 80 | 80 | 80 | 80 | 82 | 82 |
| Gasoline Inspections: | | | | | | | | |
| Doctor Test | DNP | DNP | DNP | DNP | DNP | Pass | Pass | Pass |
| Mercaptan sulfur, mg./100 ml | 3.5 | 2.5 | 2.5 | 2 | 1 | 0.5 | 0.5 | 0.0 |
| Per cent Mercaptan Removed | 82.5 | 87.5 | 87.5 | 90.0 | 95.0 | 97.5 | 97.5 | 100 |
| Reactive sulfur, mg./100 ml | | | | | | | | |
| Peroxide Number | | | | | | | | |
| Gravity, °API | | | | | | | | |
| Dist., Naph.— | | | | | | | | |
| I. B. P., °F.: | | | | | | | | |
| 212 | | | | | | | | |
| 302 | | | | | | | | |
| 392 | | | | | | | | |
| F. B. P., °F | | | | | | | | |
| Per cent Recovery | | | | | | | | |
| Per cent Loss | | | | | | | | |

[1] Three minutes vigorous agitation in the presence of nitrogen.
[2] Equivalent to sodium hydroxide solution (11.2° Bé.) in "OH" concentration.
[3] DNP=does not pass.

From these data it can be seen that in all cases homogenization gave better mercaptan removal than did batch agitation. When these results are plotted on a curve so as to obtain exactly equivalent percentage treats, the improvement corresponds to an increased mercaptan removal up to 10%.

The greatest significance of this incremental improved efficiency of extraction appears in the data in columns 14, 15, 16, and 17 of Table I which were obtained when using a caustic solution containing a solutizer. For a 10% treat batch agitation did not give a product passing the "doctor" test, while essentially similar percentage treat by homogenization did give a "sweet" product, i. e., passing the doctor test. For a 20% treat batch agitation leaves a fractional content of mercaptans, while 25% one stage homogenization gives a sweet product free of mercaptans. To secure a sweet product by batch agitation in further experiments required eight countercurrent stages.

Similar results are shown on the comparison between batch operation and homogenization when extracting mercaptans from a naphtha containing a large amount of sulfur, presented in Table II, the oil and the reagent being pumped through a homogenization valve as in the previous experiment.

TABLE II

Extraction of Mercaptans from Untreated High Sulfur Naphtha with Sodium Hydroxide Solutions by Batch Agitation and by Homogenization

| Column Number | 1 | 2 | 3 | 4 | 5 | 6 | 7 | 8 | 9 |
|---|---|---|---|---|---|---|---|---|---|
| Stock and Procedure | Untreated High Sulfur Naphtha | Treated with Sodium Hydroxide, 11.2° Bé. | | | | Treated with Sodium Hydroxide, 30° Bé. | | | |
| | | Batch Treat [1] | Batch Treat [1] | 3000 #/Sq. In. Homogenization | | Batch Treat [1] | Batch Treat [1] | 3000 #/Sq. In. Homogenization | |
| Operation Conditions: | | | | | | | | | |
| Per cent Treat | Not treated | 10 | 20 | 11 | 23.3 | 10 | 20 | 11 | 19 |
| Treating Temp., °F | | 75 | 75 | 75 | 75 | 75 | 75 | 75 | 75 |
| Gasoline Inspections: | | | | | | | | | |
| Doctor Test | [2] DNP | DNP | DNP | DNP | DNP | DNP | DNP | DNP | DNP |
| Mercaptan sulfur, mg./100 ml | 35 | 23 | 19 | 21 | 17 | 20 | 16 | 19 | 16 |
| Per cent Mercaptan Removal | | 34 | 46 | 40 | 51 | 43 | 54 | 46 | 54 |
| Reactive sulfur, mg./100 ml | 0 | | | | | | | | |
| Peroxide No | 0 | | | | | | | | |
| Gravity, °API | 50.9 | | | | | | | | |
| Distillation Naph.— | | | | | | | | | |
| I. B. P., °F.: | 172 | | | | | | | | |
| 212 | 4.5 | | | | | | | | |
| 302 | 54.5 | | | | | | | | |
| 392 | 95.0 | | | | | | | | |
| F. B. P., °F | 421 | | | | | | | | |
| Per cent Recovery | 98.5 | | | | | | | | |
| Per cent Loss | 0.9 | | | | | | | | |

[1] Three minutes agitation in the presence of nitrogen.
[2] DNP=does not pass.

These data show an improvement in mercaptan removal by homogenization in comparison with batch agitation ranging up to 4.6% greater mercaptan removal efficiency for exactly equivalent percentage treats.

An evaluation of the degree of approach of the homogenization method to a theoretical stage was made by determining the effect of time of agitation on the per cent of mercaptan removal by batch extraction as shown in Table III:

TABLE III

EFFECT OF TIME OF AGITATION ON PER CENT MERCAPTAN REMOVAL FROM UNTREATED HIGH SULFUR NAPHTHA USING 10% BY VOL. OF 11.2° BÉ. NaOH

*Per cent mercaptan removal vs. time of agitation feed stock, 35 mg. mercaptan sulfur/100 ml.*

| Time of agitation, Min. | 3 | 5 | 10 | 20 | 30 | Homogenization 60 |
|---|---|---|---|---|---|---|
| Per cent mercaptans removed | 33 | 35 | 37 | 38 | 38.5 | 40  40 |

These data show that 60 minutes agitation gives only a 7% greater mercaptan removal than 3 minutes of agitation. Although the 60-minute agitation did not give results exactly equivalent to a theoretical stage, it is evident that homogenization effected instantaneously the same percentage (40%) mercaptan removal as 60 minutes of batch agitation.

It is thus evident that this invention affords an economical process for the contacting of two immiscible liquids assuring greater efficiency with very short times of contact.

The nature and objects of the present invention having thus been set forth and specific examples of the same given, what is claimed as new and useful and desired to be secured by Letters Patent is:

1. An improved process for the removal of mercaptans from petroleum naphthas comprising mixing said naphtha with a solution of caustic, subjecting the mixture of caustic and naphtha to a mechanical shearing pressure between 2000 and 5000 lbs. per square inch obtained by forcing the mixture through the extremely small opening of a valve and immediately separating the caustic from the naphtha.

2. An improved process for the removal of mercaptans from petroleum naphthas by means of a solution of caustic comprising pumping said naphtha and said caustic through a common orifice at a pressure of 3000 lbs. per square inch and immediately separating the caustic from the naphtha.

MINOR C. K. JONES.

REFERENCES CITED

The following references are of record in the file of this patent:

UNITED STATES PATENTS

| Number | Name | Date |
|---|---|---|
| 2,311,593 | Kalichevsky et al. | Feb. 16, 1943 |
| 2,080,737 | Nutt et al. | May 18, 1937 |
| 2,323,616 | McAfee et al. | July 6, 1943 |
| 2,325,052 | Grosse et al. | July 27, 1943 |
| 2,164,665 | Rogers et al. | July 4, 1939 |
| 1,621,475 | Cross | Mar. 15, 1927 |
| Re. 17,719 | Jones | July 1, 1930 |
| 1,927,853 | Stratford | Sept. 26, 1933 |
| 1,816,528 | Haysel | July 28, 1931 |
| 2,169,545 | Vose | Aug. 15, 1939 |
| 2,381,293 | LaLande | Aug. 7, 1945 |
| 2,085,525 | De Simo et al. | June 29, 1937 |

FOREIGN PATENTS

| Number | Country | Date |
|---|---|---|
| 377,480 | Great Britain | July 28, 1932 |